United States Patent
Akiyama et al.

(10) Patent No.: US 8,041,097 B2
(45) Date of Patent: Oct. 18, 2011

(54) CONFOCAL MICROSCOPE

(75) Inventors: Shuji Akiyama, Tokyo (JP); Akihiro Kitahara, Tokyo (JP)

(73) Assignee: Olympus Corporation, Tokyo (JP)

( * ) Notice: Subject to any disclaimer, the term of this patent is extended or adjusted under 35 U.S.C. 154(b) by 624 days.

(21) Appl. No.: 12/208,536

(22) Filed: Sep. 11, 2008

(65) Prior Publication Data

US 2009/0097109 A1 Apr. 16, 2009

Related U.S. Application Data

(63) Continuation of application No. PCT/JP2007/001235, filed on Nov. 13, 2007.

(30) Foreign Application Priority Data

Nov. 27, 2006 (JP) ................................. 2006-318965

(51) Int. Cl.
*G06K 9/00* (2006.01)
(52) U.S. Cl. .......... 382/133; 382/254; 359/368; 348/79; 348/370
(58) Field of Classification Search .......... 382/100–302; 359/368–389; 348/79–80, 370–371
See application file for complete search history.

(56) References Cited

U.S. PATENT DOCUMENTS

| | | | | |
|---|---|---|---|---|
| 5,179,419 A | * | 1/1993 | Palmquist et al. | 382/108 |
| 7,003,143 B1 | * | 2/2006 | Hewitt et al. | 382/128 |
| 7,078,664 B2 | * | 7/2006 | Kitahara | 359/389 |
| 7,315,637 B2 | * | 1/2008 | Xi et al. | 382/128 |
| 7,321,394 B1 | * | 1/2008 | Grodevant | 348/370 |
| 7,469,160 B2 | * | 12/2008 | Banks et al. | 600/476 |
| 2006/0002634 A1 | * | 1/2006 | Riley et al. | 382/294 |
| 2008/0088721 A1 | * | 4/2008 | Grodevant | 348/255 |

FOREIGN PATENT DOCUMENTS

| | | |
|---|---|---|
| JP | 6-308393 A | 11/1994 |
| JP | 8-278450 A | 10/1996 |

* cited by examiner

*Primary Examiner* — Manav Seth
(74) *Attorney, Agent, or Firm* — Holtz, Holtz, Goodman & Chick, P.C.

(57) ABSTRACT

To provide a confocal microscope for obtaining an extended image by easily determining the capturing range of an observation image without being aware of the shape of a sample to be observed, the confocal microscope comprises confocal image generating unit for generating a confocal image, first counting unit for counting a first number of pixels having a predetermined brightness level or lower among the brightness levels of the pixels of the confocal image, second counting unit for counting a second number of pixels obtained by extracting only a pixel that matches a predetermined condition for the confocal image, and boundary determining unit for detecting a boundary by determining whether or not the observation surface is within the image capturing range based on the first and the second numbers of pixels.

8 Claims, 8 Drawing Sheets

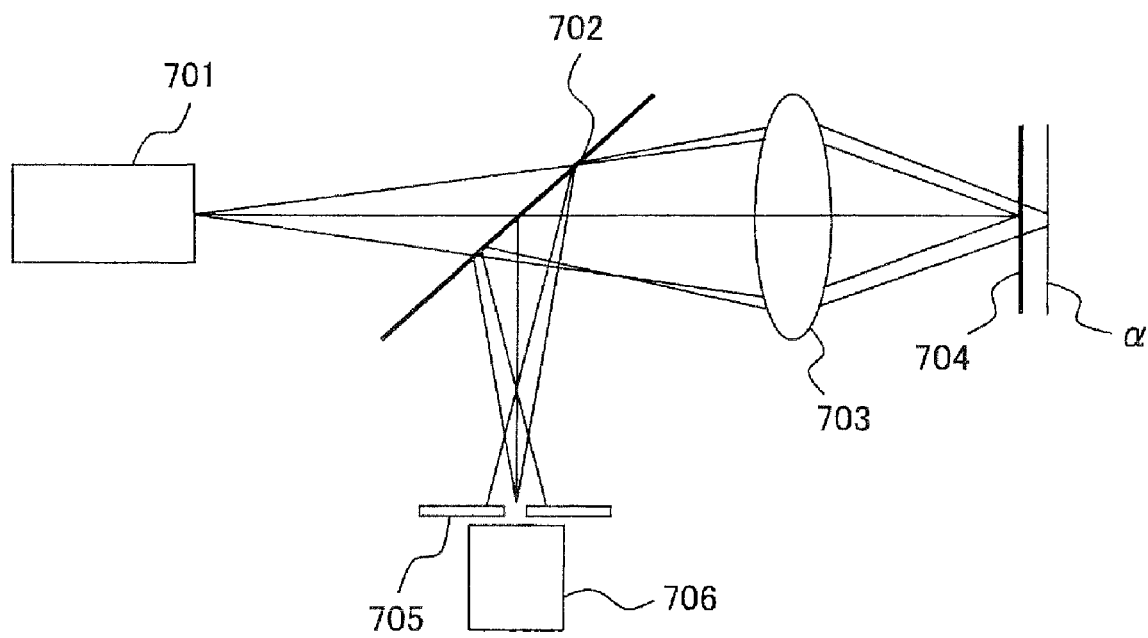
F I G. 1

CONFOCAL MICROSCOPE

CROSS REFERENCE TO RELATED APPLICATION

This is a Continuation Application of PCT application No. PCT/JP2007/001235, filed Nov. 13, 2007, which was not published under PCT Article 21(2) in English.

This application is based upon and claims the benefit of priority from the prior Japanese patent Application No. 2006-318965, filed Nov. 27, 2006, the entire contents of which are incorporated herein by reference.

BACKGROUND OF THE INVENTION

1. Field of the Invention

The present invention relates to a confocal microscope with which a confocal image of a sample to be observed can be obtained.

2. Description of the Related Art

Conventionally, there are microscopes having a confocal optics system (hereinafter referred to as a confocal microscope) that illuminates a sample to be observed with a pointlike light source in a pointlike shape, forms the pointlike image of the light reflected from the illuminated sample, and obtains the density information of the image with a detector via a pinhole.

FIG. 1 is a schematic diagram showing the outline of the configuration of the confocal optics system. As shown in this figure, light irradiated from a pointlike light source 701 gathers at one point of a sample to be observed 704 with an objective lens 703 the aberration of which is properly corrected, and illuminates the sample 704.

The light reflected from the sample 704 is formed as a pointlike image on a pinhole 705 via a half mirror 702, and the light formed as the pointlike image is detected by a light detector 706 via the pinhole 705. By two-dimensionally scanning the sample 704, for example, similar to the raster scanning of a television, a two-dimensional image (hereinafter referred to as a confocal image) is obtained.

Here, reflected light in a position "a" displaced from the light-gathering position of the objective lens 703 is not gathered on the pinhole 705. Therefore, the reflected light does not pass through the pinhole 705 and is not detected by the light detector 706. Accordingly, with the optics system shown in FIG. 1, the image only in the light-gathering position, namely, the focusing position of the objective lens 703 can be obtained.

The focal depth of the above described confocal optics system is shallow. Therefore, there are no problems if an observation surface of the sample 704 is a flat surface. However, if the sample has non-flat observation surfaces where there are projections and depressions of different lengths as shown in FIG. 2, the image of a surface of the sample away from the focusing position cannot be obtained.

FIG. 2 shows an example of the sample having the non-flat observation surfaces. The sample 800 shown in this figure is a sample having non-flat observation surfaces A, B, and C of different heights a, b, and c (b>a>c). Z is the irradiation direction of light. For example, when the observation surface A is focused, observation images of the observation surfaces B and C cannot be obtained.

Accordingly, it is impossible to observe all the observation surfaces A, B, and C by performing an observation operation only once. To observe all the observation surfaces A, B and C, observation images obtained by individually focusing the observation surfaces A, B and C must be synthesized.

However, an observer must determine the focusing position of each of, for example, the observation surfaces A, B and C while viewing an observation image. Therefore, the observer must determine focusing positions for all of observation surfaces whenever he or she observes a sample like that 800 shown in FIG. 2, leading to a heady load on the observer.

As a solution to this problem, Patent Document 1 discloses a scanning-type optical microscope that can obtain an observation image of a sample without determining focusing positions for all of observation surfaces by automatically setting an image capturing range for a sample having the observation surfaces of different heights, and can reduce a load on an observer.

With the scanning-type optical microscope disclosed by Patent Document 1, a confocal image is captured while the microscope moves between first and second stages, and a focused image (herein after referred to as an extended image) in an entire measurement region can be obtained even if a user does not set the image capturing range.

However, according to Patent Document 1, the image capturing range is determined depending on whether or not the number of pixels of a predetermined brightness level or lower is equal to or larger than a preset number of pixels in a confocal image obtained in an arbitrary stage position. Accordingly, for a sample having a plurality of level differences (for example, the sample 800 shown in FIG. 2), the image capturing range is erroneously determined to end at the initial level difference.

As a solution to this problem, Patent Document 2 discloses a scanning-type microscope that can automatically sets an image capturing range without fail even for a sample having observation surfaces of different heights.

The scanning-type microscope disclosed by Patent Document 2 uses the numbers of observation surfaces (the numbers of flat surfaces) of a sample to be observed. Namely, the number of flat surfaces Nup in an upper limit direction of an initial focusing position, and the number of flat surfaces Ndown in a lower limit direction are used. Assuming that the initial focusing position exists between A and C in the sample shown in FIG. 2, the numbers of flat surfaces Nup and Ndown are 2 and 1 respectively.

Then, the number of pixels of brightness equal to or lower than a predetermined level in an obtained confocal image is counted while the stage on which the sample is put is being moved in one direction, and a flat surface is determined depending on whether or not the counted number of pixels is equal to or larger than a predetermined number of pixels. Then, the number of flat surfaces is counted each time a flat surface is detected.

A position where the number of flat surfaces reaches a set value (for example, Nup=2) is stored as a first stage position. Similarly, the number of pixels of brightness equal to or lower than a predetermined level in an observation image is counted while the stage on which the sample is put is being moved in the reverse direction, and a flat surface is determined depending on whether or not the counted number of pixels is equal to or larger than a predetermined number of pixels. Then, the number of flat surfaces is counted, and a position where the number of flat surfaces reaches a preset value (for example, Ndown=1) is stored as a second stage position.

With the above described process, the first and the second stage positions are detected and the confocal image between the first and the second stage positions can be obtained even for a sample having observation surfaces with a plurality of level differences. As a result, an extended image can be obtained.

[Patent Document 1] Japanese Published Unexamined Application No. H06-308393

[Patent Document 2] Japanese Published Unexamined Application No. H08-278450

SUMMARY OF THE INVENTION

A confocal microscope according to the present invention is a confocal microscope for obtaining a confocal image of an observation surface of an observation sample by moving a light-gathering position by each predetermined height, for extracting a pixel of maximum brightness for each pixel of the confocal image, and for generating a focused image in the entire moving region of the light-gathering position, and comprises light detecting unit for detecting light reflected from the observation sample via a pinhole, confocal image generating unit for generating a confocal image from a detection signal provided from the light detecting unit, first counting unit for counting a first number of pixels having a predetermined brightness level or lower among the brightness levels of pixels of the confocal image, second counting unit for counting a second number of pixels obtained by extracting only a pixel that matches a predetermined condition for the confocal image, and boundary determining unit for determining the boundary of image capturing of the observation sample based on the first and the second numbers of pixels.

BRIEF DESCRIPTION OF DRAWINGS

FIG. 1 is a schematic diagram showing the outline of the configuration of a confocal optics system;

DESCRIPTION OF THE PREFERRED EMBODIMENTS

Conventionally, it is necessary to preset the numbers of observation surfaces in upper and lower limit directions of an initial focusing position. Therefore, a user must set capturing conditions of an observation image by being aware of the shape of a level difference of a sample.

Preferred embodiments disclose confocal microscopes with which an extended image can be obtained by easily determining an image capturing range without being aware of the shape of a sample to be observed in light of the above described problems.

The preferred embodiments according to the present invention are descried below with reference to FIGS. 3 to 8.

First Preferred Embodiment

Figure 2:
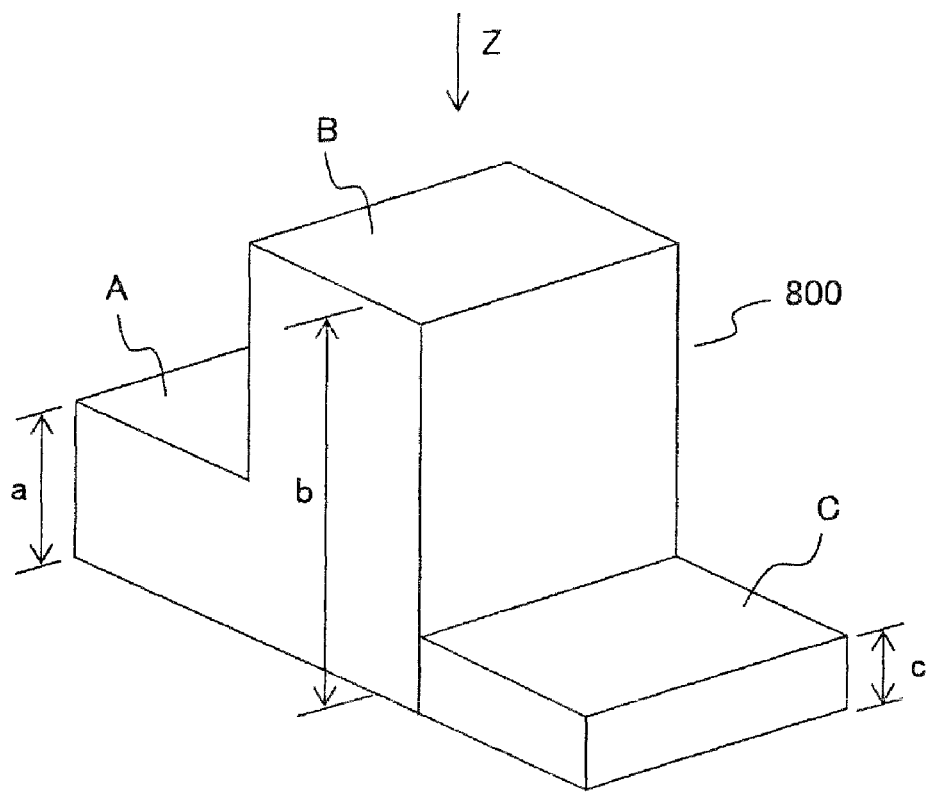
FIG. 2 is a schematic diagram exemplifying a sample having non-flat observation surfaces.
Figure 3:
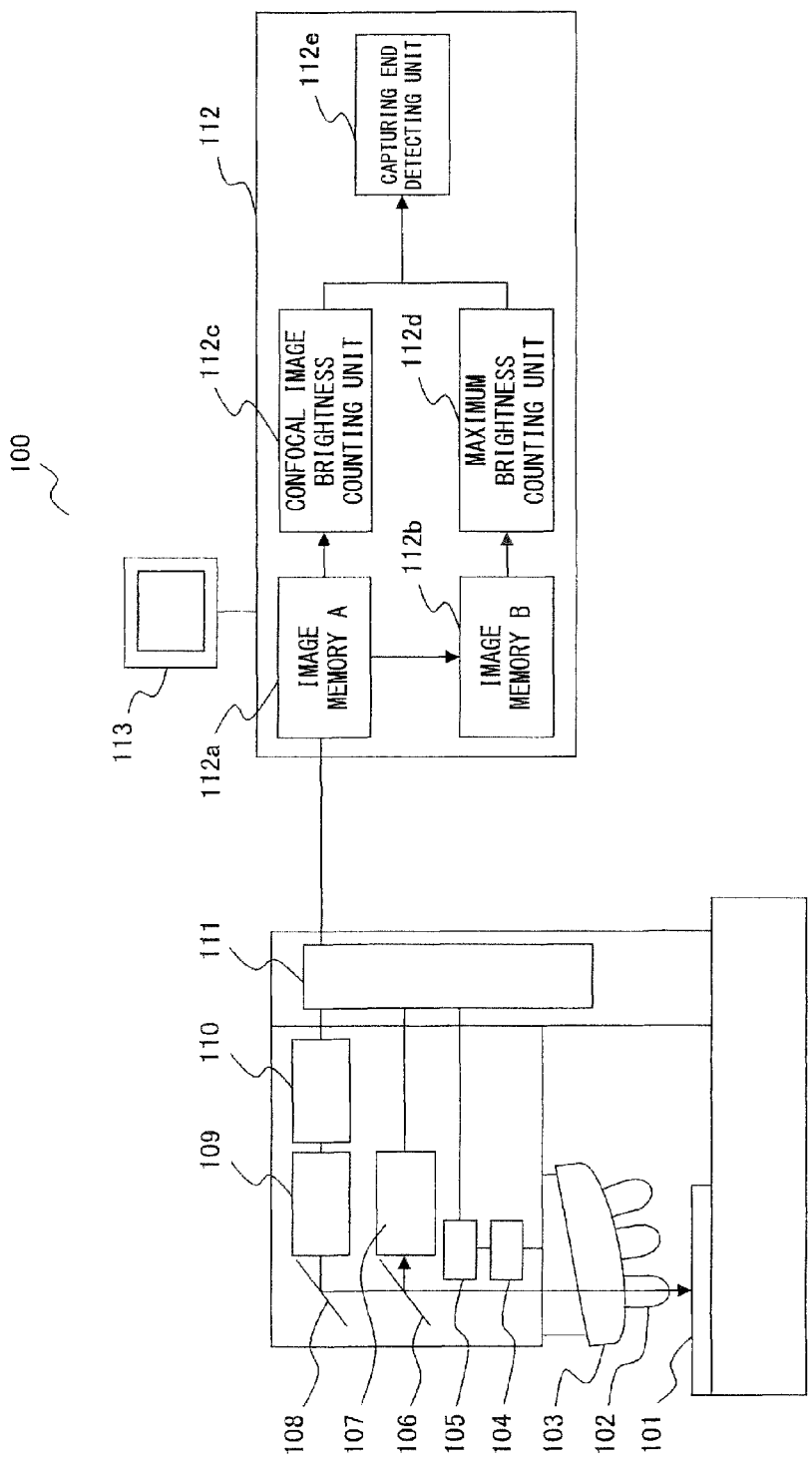
FIG. 3 is a block diagram exemplifying a configuration of a confocal microscope according to a first preferred embodiment of the present invention.

FIG. 3 is a block diagram exemplifying a configuration of a confocal microscope 100 according to the first preferred embodiment of the present invention.

The confocal microscope 100 shown in FIG. 3 comprises at least objective lenses 102, an objective lens switching unit 103 for switching among the objective lenses 102, a Z position detecting unit 104 for detecting the position of the objective lens 102 in the optical axis direction (hereinafter referred to as a Z position), a Z position controlling unit 105 for controlling the Z position of the objective lens 102, a half mirror 106, a light detecting unit 107 for detecting light, a mirror 108, a laser illumination 109 for irradiating laser light, a laser illumination controlling unit 110 for controlling the laser illumination 109, a microscope controlling unit 111 for controlling each constituent element according to an instruction issued from an information processing device, the information processing device 112 for obtaining an observation image by issuing an instruction to the microscope controlling unit 111, and a monitor 113 for displaying the obtained observation image.

Laser light irradiated from the laser illumination 109 illuminates a sample via the mirror 108 and the objective lens 102. The laser light reflected from the sample 101 is gathered on the light detecting unit 107 via the objective lens 102 and the half mirror 106. The gathered laser light is detected by the light detecting unit 107 via a pinhole not shown.

A confocal image is obtained by two-dimensionally scanning laser light that illuminates the sample 101 with a two-dimensional scanner, etc. not shown, and by detecting the light reflected from the sample 101 with the light detecting unit 107. At this time, light reflected in an unfocused position of the sample 101 is not gathered on the pinhole. Therefore, the image only in the focused position is obtained.

Additionally, a confocal image in each Z position is sequentially obtained by driving the objective lens 102 with the Z position controlling unit 105, and by changing the distance of the objective lens 102 relative to the sample 101. Then, a focused image (hereinafter referred to as an extended image) in the entire measurement region is obtained by extracting maximum brightness for each pixel from the plurality of obtained images. The moving range of the Z position at this time is referred to as an image capturing range.

The Z position controlling unit 105, the light detecting unit 107 and the laser illumination controlling unit 110 are connected to the information processing device 112 via the microscope controlling unit 111.

Here, the information processing device 112 according to this preferred embodiment comprises at least a CPU for executing a program, etc. for implementing the confocal microscope 100 according to this preferred embodiment, a memory (such as a RAM) used to execute the program, an input device (such as a keyboard or a mouse) that is unit for externally inputting data, an output device for outputting an extended image, an operational screen, etc. to the monitor 113, a storage device for storing the program, etc., an image memory A112a for storing a confocal image, and an image memory B112b for storing an image obtained by extracting a pixel of maximum brightness among confocal images obtained from an observation starting position to the current Z position. Since the CPU, the memory, the input device, the output device, and the storage device are typical constituent elements, they are not shown in FIG. 3.

The information processing device 112 comprises, by causing the CPU to execute a predetermined program, confocal image brightness counting unit 112c for counting the number of pixels of a predetermined brightness level (hereinafter referred to as a reference brightness level A) or lower by making a comparison between the brightness of each pixel of an image stored in the image memory A112a and the reference brightness level A, maximum brightness counting unit 112d for counting the number of pixels of a predetermined brightness level (hereinafter referred to as a reference brightness level B) or higher by making a comparison between the brightness of each pixel of an image stored in the image memory B112b and the reference brightness level B, and capturing end detecting unit 112e for detecting a capturing end position from the counting results of the confocal image brightness counting unit 112c and the maximum brightness counting unit 112d.

A user determines an observation starting position by moving the Z position of the objective lens 102 to a lower side focal position (or an upper side focal position) while viewing an image output on the monitor 113. Then, the confocal microscope 110 starts to capture an extended image at the observation starting position when a user performs a corresponding operation. Furthermore, the confocal microscope 100 automatically detects a capturing end position, and terminates the process for capturing the extended image.

In the above described configuration, the confocal image brightness counting unit 112c implements first counting unit, whereas the maximum brightness counting unit 112d implements second counting unit. Additionally, the capturing end detecting unit 112e implements boundary determining unit.

Figure 4:
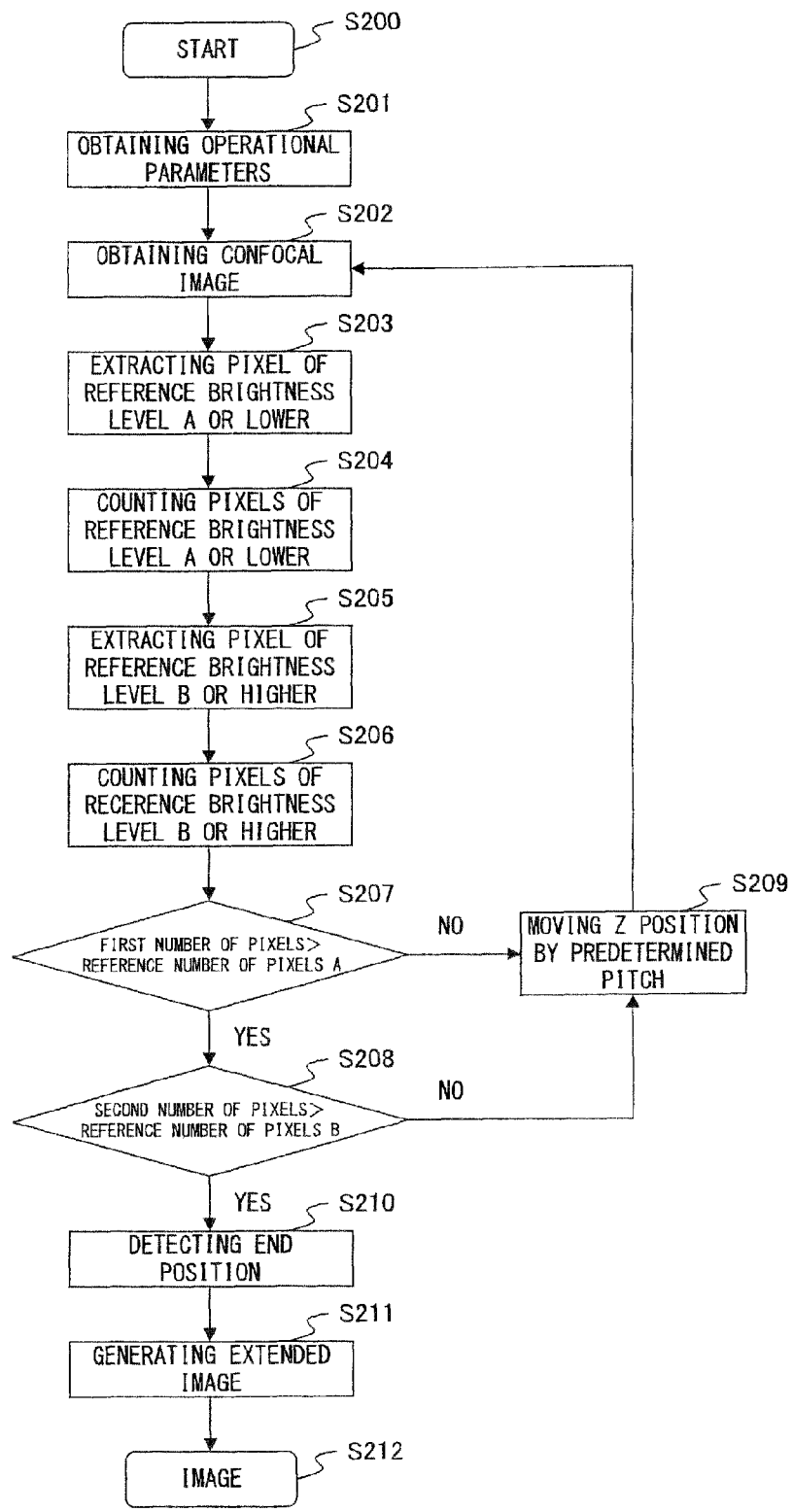
FIG. 4 is a flowchart showing a process of the confocal microscope according to the first preferred embodiment of the present invention.

FIG. 4 is a flowchart showing the process of the confocal microscope 100 according to the first preferred embodiment of the present invention.

When a user performs a predetermined operation with the input device, the confocal microscope 100 starts the process for capturing an extended image, and moves the process to step S201.

In step S201, the confocal microscope 100 reads parameters required for the operations (hereinafter referred to as operational parameters), for example, from the storage device comprised by the information processing device 112.

Here, the operational parameters include, for example, the maximum moving amount (not the capturing end position) of the objective lens 102 in the upper (or the lower) limit direction, the moving pitch of the objective lens 102 in the Z direction, the reference brightness level A, the reference brightness level B, a reference number of pixels A, and a reference number of pixels B, and the like. The reference levels A and B, and the reference numbers of pixels A and B are reference values preset as needed.

In step S202, the confocal microscope 100 obtains a confocal image by performing the operations described with reference to FIG. 3. Then, the confocal microscope 100 stores the obtained confocal image in the image memory A112a. Additionally, the confocal microscope 100 makes a comparison, for each pixel, between the brightness of the obtained confocal image and that of an image stored in the image memory B112b, updates to the image data of the pixel of higher brightness, and stores the updated data in the image memory B112b.

In step S203, the confocal microscope 100 makes a comparison, for each pixel, between the brightness value of the confocal image stored in the image memory A112a and the reference brightness level A, and extracts pixels of the reference brightness level A or lower. Then, in step S204, the confocal microscope 100 counts the pixels extracted in step S203. The number of pixels at this time is hereinafter referred to as a first number of pixels.

In step S205, the confocal microscope 100 makes a comparison, for each pixel, between the brightness value of the image stored in the image memory B112b and the reference brightness level B, and extracts pixels of the reference brightness level B or higher. Then, in step S206, the confocal microscope 100 counts the pixels extracted in step S205. The number of pixels at this time is hereinafter referred to as a second number of pixels.

In step S207, the confocal microscope 100 makes a comparison between the first number of pixels counted in step S204 and the preset reference number of pixels A. If the first number of pixels is larger than the reference number of pixels A, the confocal microscope 100 moves the process to step S208. If the first number of pixels is equal to or smaller than the reference number of pixels A, the confocal microscope 100 moves the process to step S209.

In step S208, the confocal microscope 100 makes a comparison between the second number of pixels counted in step S206 and the preset reference number of pixels B. If the second number of pixels is larger than the reference number of pixels B, the confocal microscope 100 determines the corresponding position to be the end position of the image capturing range, and moves the process to step S210. If the second number of pixels is equal to or smaller than the reference number of pixels B, the confocal microscope 100 moves the process to step S209.

In step S209, the confocal microscope 100 moves the Z position in an upward (or downward) direction of the Z axis by the moving pitch set as an operational parameter. Then, the confocal microscope 100 moves the process to step S202, and executes steps S202 to S207 or steps S202 to S209.

In step S210, the confocal microscope 100 terminates the process for obtaining a confocal image, and moves the process to step S211. Then, the confocal microscope 100 generates an extended image from the obtained confocal image, and terminates the process.

As described above, the confocal microscope 100 according to this preferred embodiment determines the end position of an image capturing range according to the first number of pixels, which is obtained by making a comparison, for each pixel, between the brightness value of a confocal image stored in the image memory A112a and the reference brightness level A and by counting pixels of the reference brightness level A or lower, and according to the second number of pixels, which is obtained by making a comparison, for each pixel, between the brightness value of an image stored in the image memory B112b and the reference brightness level B and by counting pixels of the reference brightness level B or higher. As a result, a user can obtain an extended image without being aware of the shape of a level difference of an observation sample by easily determining an image capturing range.

A preset constant is used as the aforementioned reference number of pixels B. However, the reference number of pixels B may be determined, for example, according to the capturing position of a confocal image as shown in FIG. 5.

Figure 5:
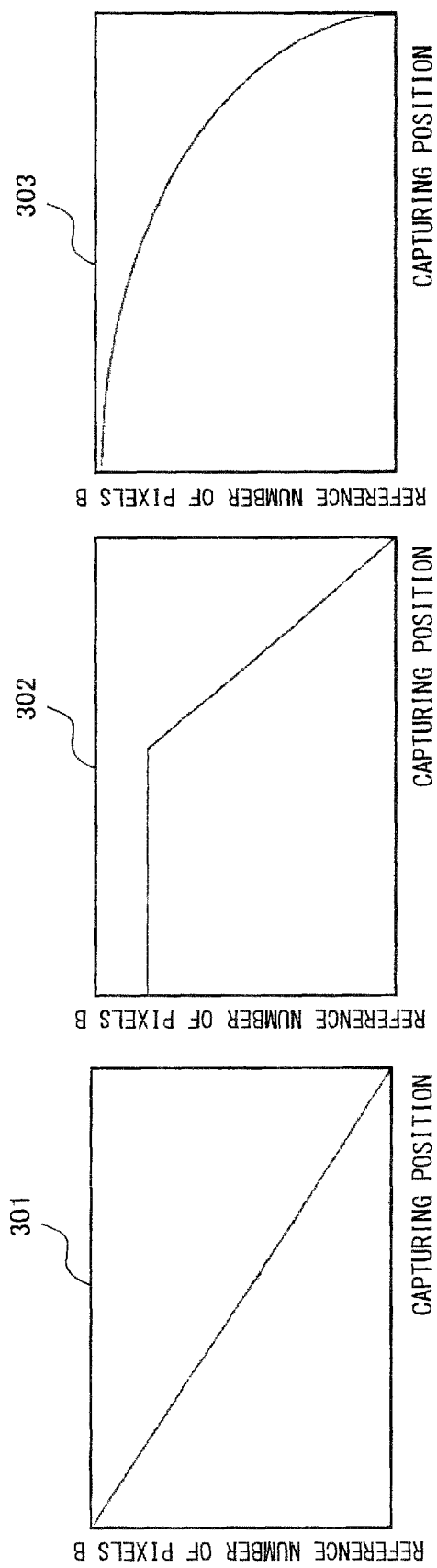
FIG. 5 exemplifies graphs for determining a relationship between an image capturing position and a reference number of pixels B.

In this case, in step S206, the confocal microscope 100 obtains the current image capturing position (Z position), determines the reference number of pixels B according to the image capturing position by referencing information (for example, a table) indicating a relationship between the image capturing position that is stored in the storage device, etc. and shown in FIG. 5 and the reference number of pixels B, and extracts pixels of the reference brightness level B or higher by making a comparison, for each pixel, between the brightness value of an image stored in the image memory B112b and the reference brightness level B.

FIG. 5 exemplifies graphs for determining a relationship between the image capturing position and the reference number of pixels B.

The graph 301 represents a linear relationship between the image capturing position and the reference number of pixels B. According to the relationship represented by this graph, the reference number of pixels B decreases with a rise in the image capturing position. When the image capturing position reaches a predetermined position, the reference number of pixels B becomes 0.

According to the graph 302, the reference number of pixels B has a constant value in the image capturing position equal to or lower than a predetermined position. When the image capturing position becomes higher than the predetermined position, the reference number of pixels B decreases with a rise in the image capturing position as represented by the graph 301. When the image capturing position reaches a certain position, the reference number of pixels B becomes 0.

The graph 303 represents a non-linear relationship between the image capturing position and the reference number of pixels B. According to the relationship represented by this graph, the reference number of pixels B decreases with a rise in the image capturing position. When the image capturing position reaches a predetermined position, the reference number of pixels B becomes 0.

The reference number of pixels B is determined based on the above described graphs 301 to 303, whereby a problem that the capturing process (for example, the processes of steps S202 to S209) is not completed can be prevented.

Second Preferred Embodiment

Figure 6:
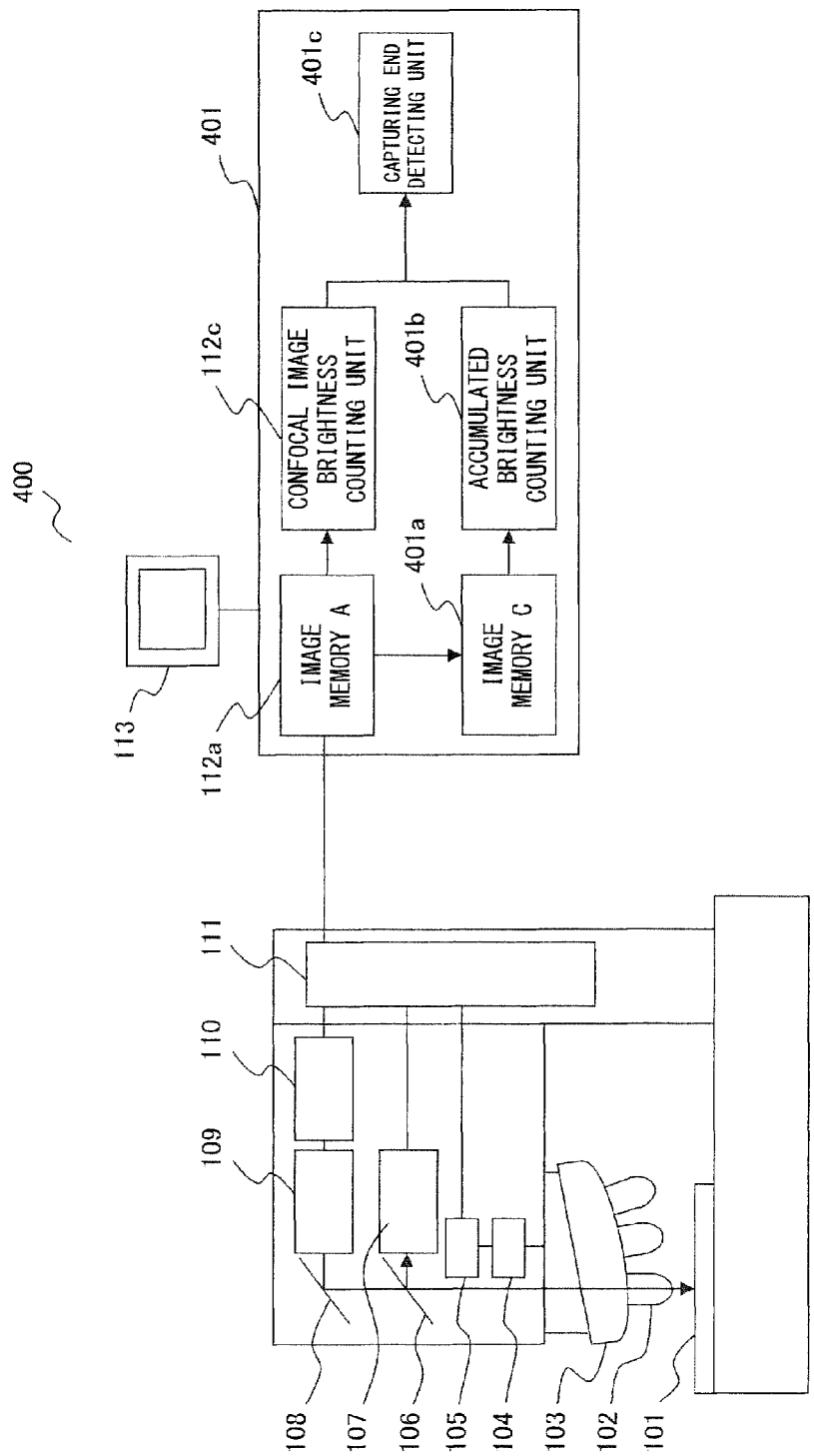
FIG. 6 is a block diagram exemplifying a configuration of a confocal microscope according to a second preferred embodiment of the present invention.

FIG. 6 is a block diagram exemplifying a configuration of a confocal microscope 400 according to the second preferred embodiment of the present invention.

The confocal microscope 400 shown in FIG. 6 comprises at least objective lenses 102, an objective lens switching unit 103 for switching among the objective lenses 102, a Z position detecting unit 104 for detecting the Z position of the objective lens 102, a Z position controlling unit 105 for controlling the Z position of the objective lens 102, a half mirror 106, a light detecting unit 107 for detecting light, a mirror 108, a laser illumination 109 for irradiating laser light, a laser illumination controlling unit 110 for controlling the laser illumination 109, a microscope controlling unit 111 for controlling each constituent element according to an instruction issued from an information processing device, the information processing device 401 for obtaining an observation image by issuing an instruction to the microscope controlling unit 111, and a monitor 113 for displaying the obtained observation image.

Here, the information processing device 401 according to this preferred embodiment comprises at least a CPU for executing a program, etc. for implementing the confocal microscope 400 according to this preferred embodiment, a memory (such as a RAM) used to execute the program, an input device (such as a keyboard or a mouse) that is unit for externally inputting data, an output device for outputting an extended image, an operational screen, etc. to the monitor 113, a storage device for storing the program, etc., an image memory A112a for storing a confocal image, and an image memory C401a for storing an image obtained by accumulating the brightness value of each pixel of confocal images obtained at an observation starting position to the current Z position. Since the CPU, the memory, the input device, the output device, and the storage device are typical constituent elements, they are not shown in FIG. 6.

The information processing device 401 according to this preferred embodiment comprises, by causing the CPU to execute a predetermined program, confocal image brightness counting unit 112c for counting the number of pixels of a reference brightness level A or lower after making a comparison between the brightness of each pixel of an image stored in the image memory A112a and the reference brightness level A, accumulated brightness counting unit 401b for counting the number of pixels of a predetermined brightness level (hereinafter referred to as a reference brightness level C) or higher after making a comparison between the brightness of each pixel of an image stored in the image memory C401a and the reference brightness level C, and capturing end detecting unit 401c for detecting a capturing end position from the counting results of the confocal image brightness counting unit 112c and the accumulated brightness counting unit 401b.

Since the configuration except for the above described constituent elements is identical to that shown in FIG. 3, its detailed explanation is omitted.

In the above described configuration, the confocal image brightness counting unit 112c implements first counting unit, whereas the accumulated brightness counting unit 401b implements second counting unit. Additionally, the capturing end detecting unit 401c implements boundary determining unit.

Figure 7:
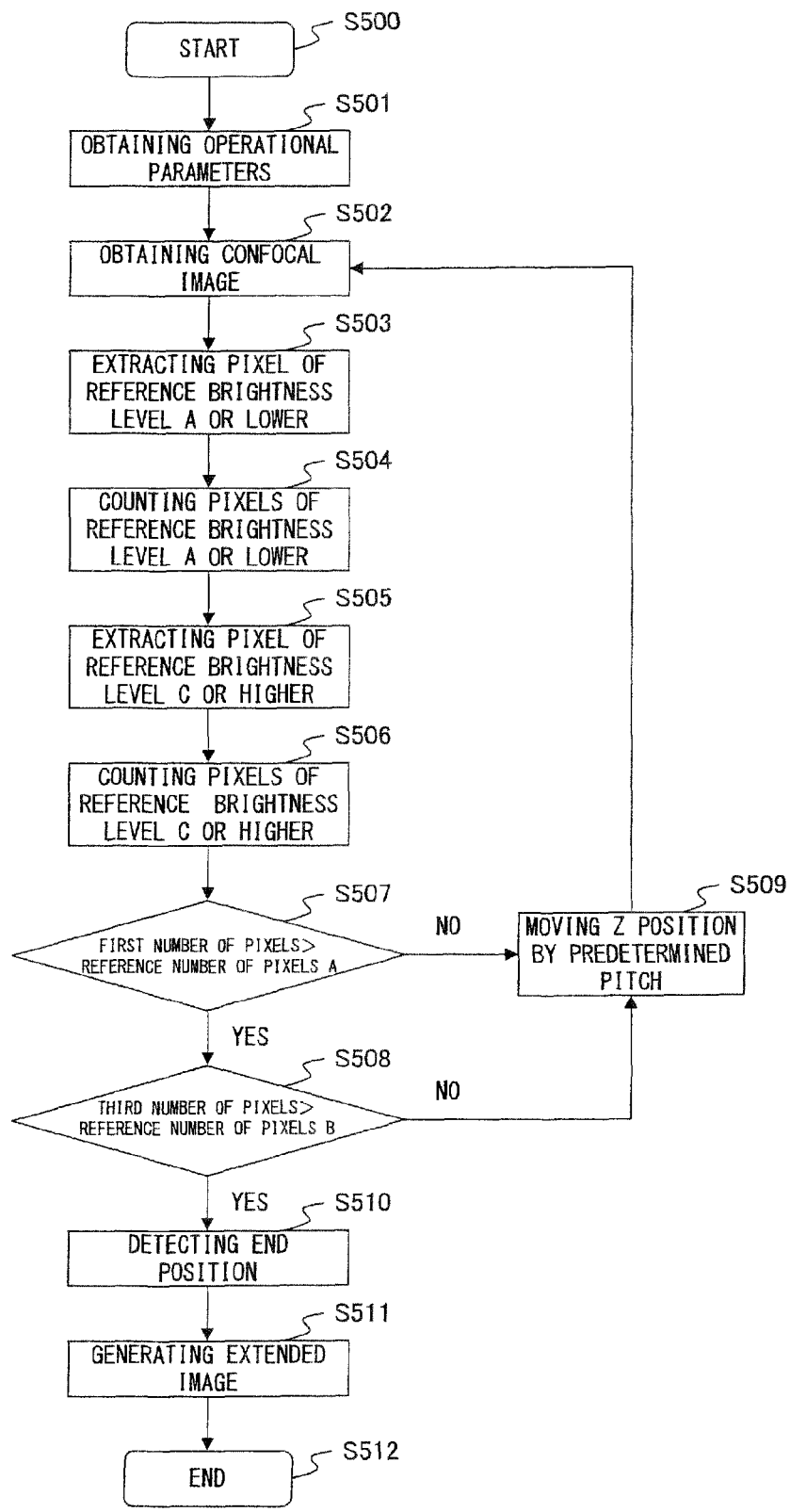
FIG. 7 is a flowchart showing a process of the confocal microscope according to the second preferred embodiment of the present invention.

FIG. 7 is a flowchart showing the process of the confocal microscope 400 according to the second preferred embodiment of the present invention.

When a user performs a predetermined operation with the input device, the confocal microscope 400 starts a process for capturing an extended image, and moves the process to step S501. Then, the confocal microscope 400 reads operational parameters, for example, from the storage device comprised by the information processing device 401.

Here, the operational parameters include, for example, the maximum moving amount (not the capturing end position) of the objective lens 102 in an upper (or lower) limit direction, the moving pitch of the objective lens 102 in the Z direction, the reference brightness level A, the reference brightness level C, a reference number of pixels A, and a reference number of pixels C, and the like. The reference levels A and C, and the reference numbers of pixels A and C are reference values preset as needed.

In step S502, the confocal microscope 400 obtains a confocal image by performing the operations described with reference to FIG. 3. Then, the confocal microscope 400 stores the obtained confocal image in the image memory A112a. Additionally, the confocal microscope 400 updates to image data obtained by accumulating the brightness of the obtained confocal image and an image stored in the image memory C401a for each pixel, and stores the updated data in the image memory C401a.

In step S503, the confocal microscope 400 makes a comparison, for each pixel, between the brightness value of the confocal image stored in the image memory A112a and the reference brightness level A, and extracts pixel of the reference brightness level A or lower. Then, in step S504, the confocal microscope 400 counts the pixels extracted in step S503. The number of pixels at this time is hereinafter referred to as a first number of pixels.

In step S505, the confocal microscope 400 makes a comparison, for each pixel, between the brightness value of the image stored in the image memory C401a and the reference brightness level C, and extracts pixels of the reference brightness level C or higher. Then, in step S506, the confocal microscope 400 counts the pixels extracted in step S505. The number of pixels at this time is hereinafter referred to as a third number of pixels.

In step S507, the confocal microscope 400 makes a comparison between the first number of pixels counted in step S504 and the preset reference number of pixels A. If the first number of pixels is larger than the reference number of pixels A, the confocal microscope 400 moves the process to step S508. If the first number of pixels is equal to or smaller than the reference number of pixels A, the confocal microscope 400 moves the process to step S509.

In step S508, the confocal microscope 400 makes a comparison between the third number of pixels counted in step S506 and the preset reference number of pixels C. If the third number of pixels is larger than the reference number of pixels C, the confocal microscope 400 determines the corresponding position to be the end position of an image capturing range, and moves the process to step S510. If the third number of pixels is equal to or smaller than the reference number of pixels C, the confocal microscope 400 moves the process to step S509.

In step S509, the confocal microscope 400 moves the Z position in an upward (or downward) direction of the Z axis by the moving pitch set as an operational parameter. Then, the confocal microscope 400 moves the process to step S502, and executes steps S502 to S507, or steps S502 to S509.

In step S510, the confocal microscope 400 terminates the process for obtaining a confocal image, and moves the process to step S511. Then, the confocal microscope 100 generates an extended image, and terminates the process.

As described above, the confocal microscope 400 according to this preferred embodiment determines the end position of an image capturing range according to the first number of pixels, which is obtained by making a comparison, for each pixel, between the brightness value of a confocal image stored in the image memory A112a and the reference brightness level A and by counting pixels of the reference brightness level A or lower, and according to the third number of pixels, which is obtained by making a comparison, for each pixel, between the brightness value of an image stored in the image memory C401a and the reference brightness level C and by counting pixels of the reference brightness level C or higher. As a result, a user can obtain an extended image by easily determining an image capturing range without being aware of the shape of a level difference of an observation sample.

A preset constant is used as the aforementioned reference number of pixels C. However, the reference number of pixels C may be determined, for example, according to the capturing position of a confocal image as shown in FIG. 8.

Figure 8:
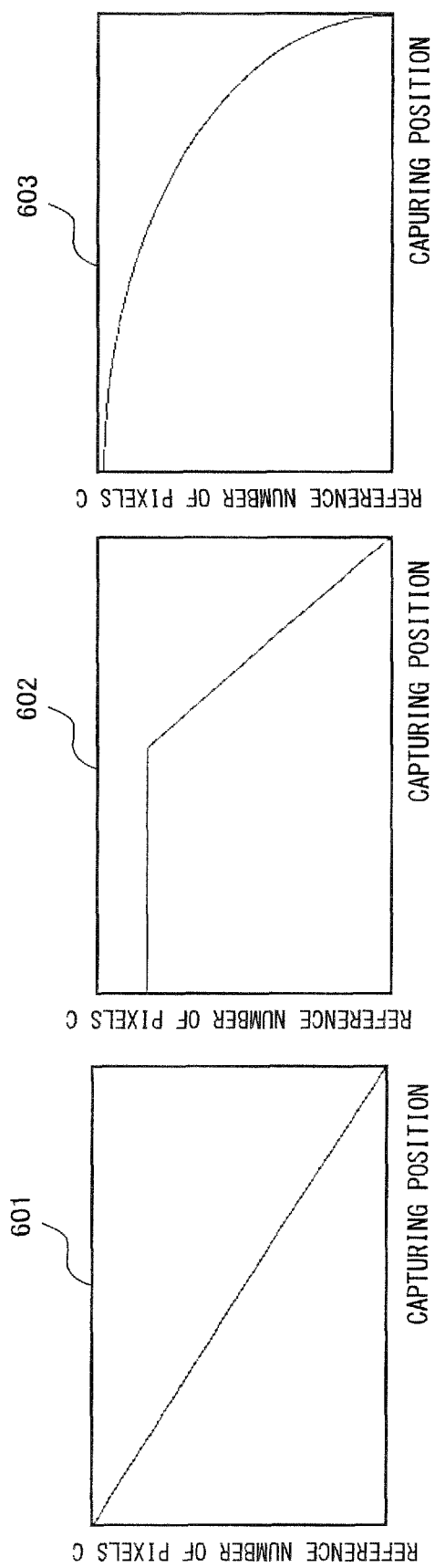
FIG. 8 exemplifies graphs for determining a relationship between an image capturing position and a reference number of pixels C.

In this case, in step S506, the confocal microscope 400 obtains the current image capturing position (Z position), determines the reference number of pixels C according to the image capturing position by referencing information (for example, a table) indicating a relationship between the image capturing position that is stored in the storage device, etc. and shown in FIG. 8 and the reference number of pixels C, and extracts a pixel of the reference brightness level C or higher by making a comparison, for each pixel, between the brightness value of an image stored in the image memory C401a and the reference brightness level C.

FIG. 8 exemplifies graphs for determining a relationship between the image capturing position and the reference number of pixels C.

The graph 601 represents a linear relationship between the image capturing position and the reference number of pixels C. According to the relationship represented by this graph, the reference number of pixels C decreases with a rise in the image capturing position. When the image capturing position reaches a predetermined position, the reference number of pixels C becomes 0.

According to the graph 602, the reference number of pixels C has a constant value in the image capturing position equal to or lower than a predetermined position. When the image capturing position becomes higher than the predetermined position, the reference number of pixels C decreases with a rise in the image capturing position as represented by the graph 601. When the image capturing position reaches a certain position, the reference number of pixels C becomes 0.

The graph 603 represents a non-linear relationship between the image capturing position and the reference number of pixels C. According to the relationship represented by this graph, the reference number of pixels C decreases with a rise in the image capturing position. When the image capturing position reaches a predetermined position, the reference number of pixels C becomes 0.

The reference number of pixels C is determined based on the above described graphs 601 to 603, whereby a problem that the capturing process (for example, the processes of steps S502 to S509) is not completed can be prevented.

In the above described first or second preferred embodiment, region specifying unit for specifying a region for which the process for detecting an observation end position is executed (steps S203 to S209, or steps S503 to S509) may be comprised within the information processing device 112 or 401.

In this case, the input device comprised by the information processing device 112 or 401 can implement the region specifying unit. For example, a user may specify a region with a mouse, etc. in an observation image displayed on the monitor 113.

A region for which the process for detecting the observation end position is executed is specified, and the process for detecting the observation end position is executed for the specified region as described above, whereby the capturing end position is automatically detected in a short time, for example, even when an image capturing range partially includes a region having a level difference. Therefore, an extended image of a region desired to be captured can be easily obtained.

In the above described first and second preferred embodiments, only the capturing end position is automatically detected. However, the capturing starting position and the capturing end position may be automatically detected with a similar process.

Specifically, this process is executed as follows.

steps S201 to S209 (note that, however, the objective lens 102 is moved in the downward direction of the Z axis) are executed as described with reference to FIG. 4. Then, in step S210, the Z position detected with the processes of steps S202 to S209 is determined to be the image capturing starting position. Thereafter, steps S202 to S212 (note that, however, the objective lens 102 is moved in the upward direction of the Z axis in step S209) described with reference to FIG. 4 are executed.

With this process, a user can capture an extended image without being aware of the capturing starting position and the capturing end position. Namely, the user can easily capture an extended image without being aware of the shape of a level difference of an observation sample.

As described above, the first and the second preferred embodiments can provide confocal microscopes with which a user can obtain an extended image by easily determining an image capturing range without being aware of the shape of a sample to be observed.

What is claimed is:

1. A confocal microscope for obtaining a confocal image of an observation surface of an observation sample by moving a light-gathering position by each predetermined height, for extracting a pixel of maximum brightness for each pixel of the confocal image, and for generating a focused image in an entire moving region of the light-gathering position, comprising:
light detecting unit for detecting light reflected from the observation sample via a pinhole;
confocal image generating unit for generating a confocal image from a detection signal provided from said light detecting unit;
first counting unit for counting a first number of pixels having a predetermined brightness level or lower among brightness levels of pixels of the confocal image;
second counting unit for counting a second number of pixels obtained by extracting only a pixel that matches a predetermined condition for the confocal image; and
boundary determining unit for determining a boundary of image capturing of the observation sample based on the first and the second numbers of pixels.

2. The confocal microscope according to claim 1, wherein said second counting unit obtains the second number of pixels by counting pixels having a predetermined brightness level or higher among brightness levels of pixels of an image obtained by extracting a pixel of maximum brightness for each pixel from all of confocal images generated by said confocal image generating unit.

3. The confocal microscope according to claim 1, wherein said second counting unit obtains the second number of pixels by counting pixels having a predetermined brightness level or higher among brightness levels of pixels of an image obtained by accumulating a brightness value for each pixel for all of confocal images generated by said confocal image generating unit.

4. The confocal microscope according to claim 1, wherein said boundary determining unit determines the boundary of image capturing of the observation sample if the first number of pixels becomes equal to or lager than a predetermined reference number of pixels corresponding to the first number of pixels, and the second number of pixels becomes equal to or larger than a predetermined reference number of pixels corresponding to the second number of pixels.

5. The confocal microscope according to claim 4, wherein the predetermined reference number of pixels corresponding to the second number of pixels decreases with a rise in the height at an arbitrary change rate.

6. The confocal microscope according to claim 1, further comprising
region specifying unit for specifying a region for which a confocal image is obtained by said confocal image generating unit.

7. The confocal microscope according to claim 1, wherein said confocal image obtaining unit determines the boundary detected by said boundary determining unit as an end position of the image capturing range.

8. The confocal microscope according to claim 1, wherein said confocal image obtaining unit determines the boundary, which is initially detected by said boundary determining unit, as a starting position of the image capturing range, and determines a boundary, which is detected next, as an end position of the image capturing range.

* * * * *